(12) United States Patent
Lynch et al.

(10) Patent No.: US 6,630,209 B2
(45) Date of Patent: Oct. 7, 2003

(54) METHOD OF MANUFACTURING TEMPERATURE RANGE ADJUSTED COATED OPTICAL FIBERS

(75) Inventors: Thomas Martin Lynch, Woodbury, MN (US); Brian Kenneth Nelson, Shoreview, MN (US); James Craig Novack, Hudson, WI (US); James Robert Onstott, Dresser, WI (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 18 days.

(21) Appl. No.: 09/780,983

(22) Filed: Feb. 9, 2001

(65) Prior Publication Data

US 2001/0006703 A1 Jul. 5, 2001

Related U.S. Application Data

(63) Continuation-in-part of application No. 09/164,015, filed on Sep. 30, 1998, now abandoned.

(51) Int. Cl.$^7$ .................................................. B05D 3/06
(52) U.S. Cl. ..................... 427/558; 427/163.2; 427/165; 427/398.1; 427/398.5; 427/407.3; 427/408; 427/557; 427/559; 427/595
(58) Field of Search .............................. 427/408, 557, 427/558, 559, 595, 165.2, 165, 398.1, 398.5, 407.3

(56) References Cited

U.S. PATENT DOCUMENTS

| | | |
|---|---|---|
| 5,217,518 A | 6/1993 | Petisce |
| 5,219,623 A | 6/1993 | Petisce |

FOREIGN PATENT DOCUMENTS

| | | | |
|---|---|---|---|
| DE | 42 26 344 A1 | 2/1994 | ......... C03B/37/012 |
| EP | 0 530 715 A1 | 8/1992 | ............. G02B/6/16 |

(List continued on next page.)

OTHER PUBLICATIONS

E. Suhir, "Calculated Stresses in Dual Optical Fibers", in Polymer Engineering and Science, Jan. 1990, vol. 30, No. 2, pp.108–117.
C. J. Aloisio, Jr., et al., "A Viscoelastic Analysis of Thermally Induced Residual Stresses in Dual Coated Optical Fibers", in International Wire & Cable Symposium Proceedings, 1995, pp 139–145 (No month avail.).
Moustafa H. Aly et al., "Microbending Loss and Stresses Induced by Both Temperature Variation and Axial Strain in Multi–coated Optical Fibers", in Journal of Optical Communications 19 (1998) 3, pp. 82–86 (No month avail.).
W. W. King et al., "Thermomechanical Mechanism for Delamination of Polymer Coatings from Optical Fibers", in Journal of Electronic Packaging, Jun. 1997, vol. 119, pp. 133–137.

Primary Examiner—Bernard Pianalto

(57) ABSTRACT

A method for manufacturing a coated optical fiber including the step of determining a desired temperature operating range of a coated optical fiber having at least one critical limit. The intercoating delamination stresses at the critical limit of said temperature range are determined. A zero-stress temperature region using the critical limit and the delamination stresses is then selected. An optical fiber is provided and the optical fiber is coated with a first polymer coating. The first polymer coating is exposed to a source of actinic radiation, wherein the source of actinic radiation generates heat. A second polymer coating including a photopolymerizable composition is applied to the optical fiber directly on the first polymer coating. The second polymer coating is cured, where at the time the second polymer coating is cured the first polymer coating is at the zero-stress temperature region.

26 Claims, 1 Drawing Sheet

FOREIGN PATENT DOCUMENTS

| | | | | |
|---|---|---|---|---|
| EP | 0 509 487 A2 | 10/1992 | ............ | G02B/6/16 |
| EP | 0 785 959 | 4/1996 | | |
| EP | 1 065 182 A2 | 1/2001 | | |
| FR | 2 629 187 | 3/1988 | ............. | F27B/9/30 |
| JP | 6-3277539 | 12/1987 | ........... | C03C/25/02 |
| JP | 1-183434 | 7/1989 | ......... | C03B/37/027 |
| JP | 1-203245 | 8/1989 | ........... | C03C/25/02 |
| JP | 1-286941 | 11/1989 | ........... | C03C/25/02 |
| JP | 4-037633 | 5/1990 | ........... | C03C/25/02 |
| JP | 4-224144 | 12/1990 | ........... | C03C/25/02 |
| JP | 4-2420136 | 1/1991 | ........... | C03C/25/02 |
| JP | 4-240137 | 8/1992 | ........... | C03C/25/02 |
| WO | WO 97/37824 | 10/1997 | ........... | B29C/35/10 |

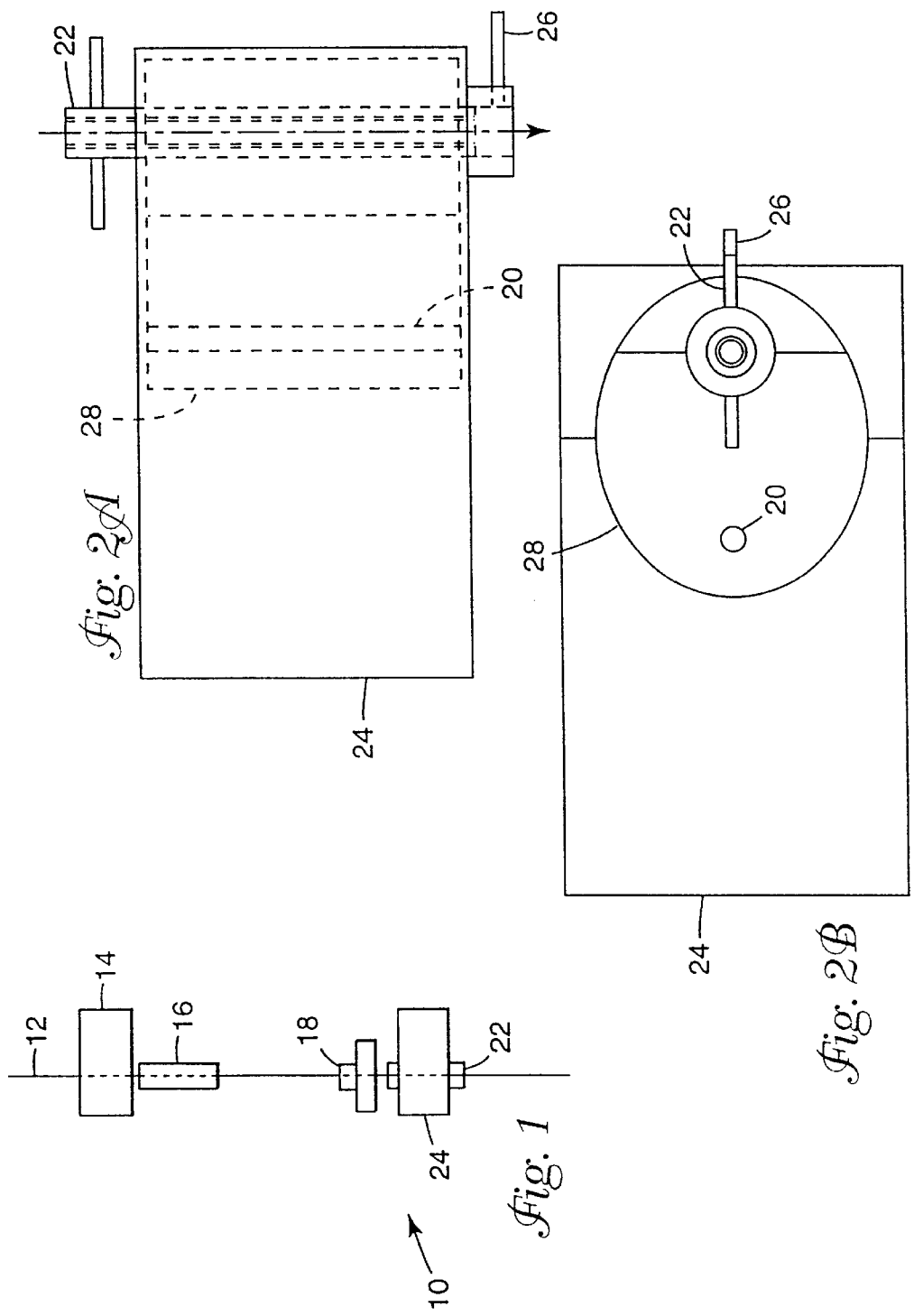

METHOD OF MANUFACTURING TEMPERATURE RANGE ADJUSTED COATED OPTICAL FIBERS

RELATED U.S. APPLICATIONS

The present application is a continuation-in-part of commonly assigned U.S. application Ser. No. 09/164,015, abandoned, entitled "Method of Manufacturing Coated Optical Fibers", filed on Sep. 30, 1998, which is hereby incorporated by reference.

STATEMENT AS TO FEDERALLY SPONSORED RESEARCH

This invention was made pursuant to DARPA Contract No. DAAH 01-95C-R128. Accordingly, the federal government may have rights in this invention.

BACKGROUND OF THE INVENTION

This invention relates to manufacturing coated optical fibers and in particular to a novel process for applying multiple coatings to the bare optical fibers.

Optical fibers typically are silica-based. To improve the moisture resistance and mechanical properties of the fiber, the fibers are often coated with multiple polymeric coatings disposed concentrically about the fiber, with the coating nearest the fiber generally being more flexible than the outermost coating(s).

To form the coatings, a photopolymerizable composition typically is applied to the fiber and polymerized by exposure to actinic radiation, e.g., ultraviolet radiation, to form a first polymer coating. Next, a second photopolymerizable composition is applied to the first polymer coating and likewise exposed to actinic radiation to form a second polymer coating.

Optical fibers are used in a variety of environmental conditions, including a wide range of temperatures. Typical operating temperature ranges may vary from 80° C. to −50° C. The possible rate temperature change of many of these optical fibers may be several tens of degrees per minute. Furthermore, optical fibers are many times placed inside of complex devices, structures, underneath roadways, in submarine applications, or in other locations where access and repair presents great challenges and costs. Also, safety devices, such as communications, guidance systems (e.g., gyroscopes), and sensors, depend on the accurate functioning of these fibers.

One problem that has been observed with such coated fibers is that under certain environmental conditions and/or tensile stresses, the first polymer coating fractures, or delaminates, or both, thereby compromising the strength and moisture resistance of the fiber. In addition, in the case of telecommunications fibers and stress-sensitive fibers such as polarization maintaining (PM) and polarizing (PZ) fibers, the fibers manifest microbending losses or other effects on the optical signal that degrade the overall performance of the fiber. In addition to the lack of system reliability caused by these fiber failures, since repair or replacement of these fibers is often extremely difficult and costly, the failures may threaten entire communication networks.

SUMMARY OF THE INVENTION

By first discovering the reasons for these failures, the present invention then discloses a novel method for manufacturing multi-coating optical fibers having a larger temperature operating range.

In a first aspect, the invention features a method for coating an optical fiber that includes: (a) applying a photopolymerizable composition to an optical fiber having a surface coated with a first polymer coating; and (b) exposing the photopolymerizable composition to a source of actinic radiation to form a second polymer coating under conditions which inhibit the production of thermally induced tensile stresses in the first polymer coating. The term optical fiber is meant to include both bare silica-based and polymeric fiber waveguides as well as coated or partially coated bare fibers.

In preferred embodiments, the fiber is cooled prior to application of the photopolymerizable composition. Preferably, this is accomplished by exposing the fiber to a chilled stream of gas (e.g., an inert gas such as helium).

Inhibiting the production of thermally induced tensile stresses in the first polymer coating during exposure may be accomplished in several ways. For example, the fiber may be cooled with a chilled stream of gas such as helium during exposure. Another protocol involves providing the source of actinic radiation with a dichroic reflector that transmits infrared radiation generated by the radiation source away from the fiber. Yet another useful protocol includes placing a water-cooled jacket concentrically about the fiber. The surface of the jacket may be further provided with an infrared radiation-absorbing coating. In another embodiment, a tube (e.g., a quartz tube) having a surface coated with an infrared radiation-absorbing coating is disposed concentrically about the fiber.

Each of these protocols may be used alone, or in combination with any, or all, of the others.

The actinic radiation preferably is ultraviolet radiation. The first polymer coating preferably includes an acrylate-functional silicone polymer, while the photopolymerizable composition preferably includes a photopolymerizable acrylate-functional epoxy or acrylate-functional urethane composition.

In a second aspect, the invention features a method for coating an optical fiber featuring a surface coated with a first polymer coating where the fiber is essentially free of a hermetic carbon coating underlying the first polymer coating. The method includes (a) cooling the fiber (e.g., by exposing the fiber to a chilled stream of gas such as helium gas); (b) applying a photopolymerizable composition to the first polymer coating; and (c) exposing the photopolymerizable composition to a source of actinic radiation to form a second polymer coating. Preferably, the method further includes inhibiting the production of thermally induced tensile stresses during exposure according to the procedures described above.

The invention provides optical fibers having multiple polymer coatings in which the production of tensile stresses within an individual polymer coating is minimized. The fibers exhibit good moisture resistance and mechanical properties, and resist delamination. The ability to minimize tensile stresses, and thus the defects associated with such stresses, makes the fibers particularly useful in defect-sensitive applications such as interferometric fiber optic gyroscopes.

Other features and advantages of the invention will be apparent from the following description of the preferred embodiments thereof, and from the claims.

BRIEF DESCRIPTION OF THE DRAWINGS

FIG. 1 is a schematic drawing of an apparatus for manufacturing coated optical fibers according to the invention.

FIG. 2A is an expanded schematic drawing of the apparatus shown in FIG. 1 illustrating the equipment used to polymerize the second photopolymerizable composition.

FIG. 2B is a top view of the equipment depicted in FIG. 2a.

DETAILED DESCRIPTION

The present invention recognizes and addresses the problem of delamination of the outer coatings of optical fiber having multiple optical coatings.

The inventors recognized that the delamination was caused by internal tensile stresses, which are generated when the fiber was subject to temperatures in the lower portion of its operating range. In building up multiple layers of coatings, the next-to-last coating will essentially have a "free surface" for expansion and contraction, and therefore will be in a zero-stress state, as long as the layer outside it is still liquid. At the time that the outer coating solidifies, the next-to-last coating will still be in a zero-stress state, and the coatings will have thicknesses which are determined in part by their temperature at the time of this solidification. The thermal stresses in the next-to-last coating will then be essentially zero any time that the final fiber is at the temperature at which the outer polymer coating cured and became solidified. However, if the next-to-last coating has a higher coefficient of thermal expansion than the materials above or below it (a typical situation for optical fibers with two polymer coatings), this next-to-last coating will try to contract faster than the materials inside and outside of it as the fiber cools. Therefore, the thermal tensile stresses in this next-to-last coating will continually increase as the fiber temperature is lowered below the zero-stress temperature, until this stress eventually exceeds the strength of one of the interfacial bonds, and the layers delaminate. Similarly, if the interfacial bonds are stronger than the cohesive strength of the next-to-last layer and the thermally induced tensile stress exceeds this cohesive bond strength upon cooling, the next-to-last layer will undergo cohesive failure and will fracture.

Silica-based optical fibers typically are provided with multiple coatings disposed concentrically about the fiber, with the coating nearest the fiber usually being more flexible than the outer coatings. When different coatings are applied, each coating is cured (photopolymerized) by exposing it to actinic radiation. The radiation of the coating polymerization processes generate heat. It was observed that because the innermost coating is more flexible, it also typically has a higher thermal expansion coefficient than either the underlying silica glass fiber or the outer polymeric coatings. When applying a second polymeric coating material over the first, the innermost coating will be in a state of essentially zero stress at the moment that the next polymeric coating cures and solidifies on the surface. However, when the temperature of the coated optical fiber changes after the coatings have solidified, thermal stresses will be generated by the differences in thermal expansion coefficient of the concentric coating materials. If the finished fiber is heated above the zero-stress point (the curing temperature of the second polymer coating in a dual coated fiber) compressive stresses will be generated in the innermost coating. The innermost coating may try to expand, but it is physically limited between the outer coating and the rigid glass fiber, which expand at a lower rate with temperature increases. When the operating range is not too high, the flexible and compliant inner coating can withstand relative high compressive stresses without damage, so increasing the temperature within normal operating temperature ranges does not destroy the fiber.

Similarly and more dramatically, if the situation is reversed and the temperature of the finished fiber is lowered below the zero stress point, the flexible inner coating will experience increasing thermal tensile stresses. The inner coating will be trying to contract more rapidly, both radially and longitudinally than the two adjacent materials. The radial tensile stresses may cause the inner coating to shrink and pull away from the interfaces with the outer coating and/or the silica glass, resulting in an unacceptable de-lamination.

To prevent this delamination or fracture during the use of an optical fiber, the present invention inhibits the formation of thermal stresses in an internal coating when subjected to later cooling by assuring that this internal coating is sufficiently cool and contracted at the time of curing of an outer coating that the interfacial delamination stress or fracture stress will not be exceeded when the resulting optical fiber is chilled to the lowest temperature in its expected operating range. The inhibition of thermal stresses may be accomplished by (1) removing sufficient thermal energy, such as by large magnitude cooling, from the inner coating to cause the inner coating to be contracted sufficiently at the time of solidification of the outer coating to avoid the formation of thermally induced tensile stresses upon later cooling of the fiber to the lowest expected operating temperature or (2) by reducing or eliminating the transfer of heat into the inner coating to keep it relatively cool and contracted until the outer coating is cured and solidified, again sufficiently to avoid the formation of thermally induced tensile stresses upon later cooling of the fiber to the lowest expected operating temperature. The main source of heat is not the ambient air, but rather the residual heat from the previous drawing and coating operations and the radiation from the curing lamp used to cure the final coating.

Similarly, the present invention also may contemplate the opposite, that is, heating the inner coating prior to the application of the outer coating, to increase the zero-stress point of the inner coating and thus the upper limit of the operating temperature range of a fiber.

FIGS. 1 and 2 illustrate an apparatus 10 for manufacturing a coated optical fiber having a plurality of polymer coatings disposed concentrically about the fiber core. As shown in FIG. 1, an optical fiber 12 provided with a first photopolymerizable coating disposed concentrically about the fiber core is exposed to actinic radiation (e.g., ultraviolet or visible radiation) from a lamp 14 to polymerize the coating. Examples of suitable materials for the first coating include relatively flexible polymers such as acrylate-functional silicone polymers. The particular type of actinic radiation and the exposure conditions are selected based upon the particular photopolymerizable coating employed.

Once polymerization is complete, the coated optical fiber is cooled at a cooling station 16. Haphazard cooling or heating of the fiber, such as cooling by the ambient air under normal processing conditions, may have little effect on the trapped thermal stresses. The present method removes or introduces a desired amount of thermal energy to alter the zero-stress state temperature of the inner coating. In the cooling example of the present invention, if too little heat is removed, the delamination failures will continue at the lower range. If too much heat is removed, a risk of failure at the upper limit of the temperature range may become an issue.

The desired zero-stress temperature of the first coating may be determined by the following process. First, the desired lower and upper limits of the operational temperature range of the specific fiber are determined. The present method contemplates that at least one of those limits is a critical temperature limit. The critical limit is defined as the operating range temperature limit where the desired fiber performance, be it measured by optical performance and/or integrity, of an unadjusted fiber may be compromised. The operational conditions stress to which the fiber will be exposed also may be analyzed and the upper and lower limits recorded. Also, the stress sensitivity, that is, the unacceptable levels of performance, e.g., optical loss, delamination, or fracture, for the expected fiber application may be quantified. The effect of inter-coating lamination adhesive forces and the thermal delamination stresses between the inner coating and both the interfaces with the outer coating and the silica glass (or, in the case of more than two coatings, with the next inner coating) are measured or calculated. These steps may be accomplished analytically or experimentally by temperature cycling a fiber having the same composition, but different zero-stress curing temperatures, and observing at what temperature and/or tensile stresses unacceptable delamination occurs. The results are recorded and a behavior model may be created. Theoretical analysis models using the known or measured coefficients of thermal expansion of the materials and the interface adhesive properties also may be developed. For applications where rapid temperature changes are expected, the models would preferably account for dynamic delamination stresses.

Using the critical limit as a base, and establishing an appropriate margin of safety, the intersection of the temperature and tensile stress curves and the points of unacceptable performance help determine a desired curing temperature zero-stress region. Accordingly, at the time of curing of the outer coating, the inner coating is cooled or heated to be within the determined zero-stress region.

In some applications, the determination of the zero-stress region also must take into account the stresses at the upper limit of the operating temperature range. If, for example, the lowering of the zero-stress point temperature region causes excessive compressive stresses on the inner coatings or excessive tensile stress on the outermost coating at the higher end of the temperature range, different coating materials having different properties may be used. Alternatively, a middle buffer coating layer composition having thermal expansion properties in between those of the innermost and outermost coatings may be applied.

In the present exemplary embodiment, the cooling is achieved by exposing the coated fiber to a chilled stream of gas. Preferably, the gas is inert with respect to the coated fiber. A number of gases may be used, including helium, nitrogen, argon, carbon dioxide, and combinations thereof. Because helium has a high thermal conductivity, it is particularly effective for cooling the coated fiber. In the present example, it was found that the gas may be cooled by running it through a coil of copper tubing submerged in a dry ice/propanol bath having a temperature of approximately −70° C. This yielded curing temperatures of approximately −55° C. to −70° C. In other alternative embodiments, the fiber was cooled to temperatures below 0° C.

Cooling the coated fiber prior to application of the second photopolymerizable coating is advantageous because it shrinks the dimensions of the coated fiber, thereby minimizing the production of tensile stresses following coating and polymerization of the second photopolymerizable coating.

Next, the cooled, coated fiber enters a coating station 18 where it is coated with a second photopolymerizable composition using conventional techniques such as die coating. The second photopolymerizable composition is designed to produce a second polymer coating concentrically disposed about the first polymer coating. The second polymer coating is generally more rigid than the first polymer coating to provide mechanical reinforcement and abrasion resistance. Typical photopolymerizable compositions for preparing the second polymer coating include photopolymerizable acrylate or methacrylate-based compositions such as photopolymerizable acrylate-functional epoxy or urethane resins. Upon exposure to actinic radiation such as ultraviolet or visible radiation, the acrylate groups polymerize to form an acrylate polymer Because proper application of the coating material typically requires that the liquid coating formulation have a relatively low, well controlled viscosity, the coating may have to be applied at a particular temperature somewhat above room temperature. In this case, it is then advantageous to further cool the fiber after the application of the second photopolymerizable composition, to assure that the inner fiber coatings are at the desired low temperature at the time that the second polymer coating is cured.

Following application of the second photopolymerizable composition, the fiber may enter an enclosure 24 housing an actinic radiation source 20 and a water-jacketed quartz tube 22 designed to cool the fiber immediately before and during actinic radiation exposure. These features are shown in greater detail in FIGS. 2(a) and 2(b).

The method of the present invention offers a solution to the delamination problem by inhibiting the future production of thermally induced tensile stresses in the inner coating at one or both limits of the intended operating temperature range by controlling the temperature of the fiber when forming the second coating. By, as explained above, setting the temperature of the inner coating to a temperature at the moment the outer coating solidifies over it, the zero stress point of the inner coating is fixed, at the desired portion of the expected operating range. This, in turn, limits the maximum thermal tensile stresses on the inner coating when the fiber is at an extreme operating range temperature.

For fibers in which low temperature range delamination is an issue, the zero-stress point is set preferably at or below the mid-point of the expected operating temperature range. As the curing and polymerization process of the outer coating generate heat, achieving this relatively low inner coating temperature at the moment of curing the outer coating may be accomplished by removing sufficient heat either before or during the curing of the second coating. Furthermore additional heat may be prevented from being added to the inner coating during the curing process, such as by the use of a dichroic reflector or an infrared absorbing coating on a water jacket.

As shown in FIGS. 2(a) and 2(b), enclosure 24 includes, as the actinic radiation source, an electrodeless ultraviolet lamp 20. Within enclosure 24, the fiber is exposed to ultraviolet radiation from lamp 20 as it moves through water-jacketed quartz tube 22. The particular exposure conditions are selected based upon the photopolymerizable composition. Upon exposure, the second photopolymerizable composition coated on the fiber polymerizes to form a second polymer coating.

Water circulating through the jacket absorbs heat and infrared radiation generated by the lamp during exposure, thereby preventing it from reaching the fiber. To enhance the heat absorption function, the outer surface of tube 22 may be further provided with an infrared-absorbing, ultraviolet-transmitting coating.

The fiber is further cooled during exposure by means of chilled helium gas supplied via a port 26. The helium may be cooled prior to contact with the fiber, e.g., by running it through a coil of copper tubing submerged in a dry ice/propanol bath.

A dichroic reflector 28 located within enclosure 24 and positioned around lamp 20 and tube 22 further assists inhibiting the formation of thermally induced tensile stresses in the first polymer coating during polymerization to form the second polymer coating. Reflector 28 reflects ultraviolet radiation generated in lamp 20 toward tube 22 but transmits infrared radiation away from tube 22, thereby reducing the amount of infrared radiation reaching the fiber.

The invention will now be described further by way of the following examples.

EXAMPLES

Comparative Example A

A freshly drawn silica fiber lacking a hermetic carbon coating was initially die-coated with a photopolymerizable, acrylate-functional, silicone composition (commercially available from Shin-Etsu under the designation "OF206") using a primary die size of 179 micrometers and a line speed of 1 m/sec. The composition was polymerized by exposing the coated fiber at a line speed of 1 m/sec to ultraviolet radiation supplied from a Fusion Systems I256 irradiator with an F10-T housing equipped with an R350 reflector, a "D" bulb, and a VPS-6 variable power supply. The maximum output of the lamp (i.e., when the power level was set at 100%) was 375 watts/inch.

After formation of the first polymer coating, the fiber was die-coated with a second photopolymerizable composition using a primary die size of 199 micrometers. The composition was an acrylate-functional epoxy resin commercially available from DSM Desotech under the designation "3471-2-137."Following coating, the fiber was exposed to ultraviolet radiation using the above-described Fusion Systems equipment. The power supply was set at 80% power during exposure.

Following ultraviolet radiation exposure, approximately 2 meters of the resulting fiber were wrapped under low tension on a 2.5 inch diameter, 0.25 inch thick aluminum cylinder. The cylinder was then mounted horizontally in a temperature-controlled chamber and the free ends of the fiber were affixed to free hanging 25 gram weights. The resulting structure was then cycled between −55° C. and 70° C. for a total of 30 cycles, after which the fiber was examined microscopically for defects such as delaminations and fractures. Examination revealed a total of nine defects in the form of delaminations and fractures.

Example 1

The procedure of Comparative Example A was followed except that prior to application of the second photopolymerizable composition, the fiber was cooled by exposing it to a stream of chilled helium gas in a cooling unit measuring 10 in. long. The final product displayed no evidence of delamination or fracture.

Example 2

The procedure of Comparative Example A was followed except that a Fusion Systems dichroic reflector was positioned around the fiber and the ultraviolet lamp. The dichroic reflector reduced the amount of infrared radiation reaching the fiber during exposure. The final product displayed no evidence of delamination or fracture.

Example 3

The procedure of Comparative Example A was followed except that during exposure the fiber was cooled by exposing it to a stream of chilled helium gas. The final product displayed no evidence of delamination or fracture.

Example 4

The procedure of Comparative Example A was followed except that during exposure the fiber was cooled by encasing it in a water-cooled jacket. The final product displayed no evidence of delamination or fracture.

Example 5

The procedure of Comparative Example A was followed except that the exposure conditions were adjusted by reducing the power level setting to 60%. The final product displayed no evidence of delamination or fracture.

Example 6

The procedure of Comparative Example A was followed except that prior to application of the second photopolymerizable composition, the fiber was cooled by exposing it to a stream of chilled helium gas, as described in Example 1. In addition, a dichroic reflector was positioned around the fiber and the ultraviolet lamp to reduce the amount of infrared radiation reaching the fiber, as described in Example 2. Moreover, during exposure the fiber was cooled by encasing it in a water jacket, as described in Example 3, and exposing it to a stream of chilled helium gas, as described in Example 4. The exposure conditions were the same as described in Example 5. The final product displayed no evidence of delamination or fracture.

Other embodiments are within the following claims. Those skilled in the art will appreciate that a variety of alternative methods may be used in accordance with the spirit of the present invention.

What is claimed is:

1. A method for manufacturing a coated optical fiber comprising:
    a) determining a desired temperature operating range of a coated optical fiber having at least one critical limit;
    b) determining the intercoating forces at the critical limit of said temperature range;
    c) selecting a zero-stress temperature region using the critical limit and the delamination stresses;
    d) providing an optical fiber;
    e) coating the optical fiber with a first polymer coating;
    f) applying a second polymer coating including a photopolymerizable composition to the optical fiber directly on the first polymer coating; and
    g) curing the second polymer coating, wherein the second polymer coating is cured while the first polymer coating is at the zero-stress temperature region.

2. The method of claim 1, wherein the critical limit is a lower limit and the method further includes the step of cooling the first coating to the zero-stress temperature region.

3. The method of claim 2, wherein the step of cooling is performed at a cooling station prior to application of the second coating, the cooling station cooling the optical fiber and the first coating to a temperature substantially below room temperature.

4. The method of claim 3, wherein the cooling station includes a chilled stream of gas.

5. The method of claim 4, wherein the chilled stream of gas includes helium.

6. The method of claim 3, wherein the cooling station includes a chilled stream of gas cooled to a temperature below 0° C.

7. The method of claim 6, wherein the chilled stream of gas is cooled in a dry ice/propanol bath.

8. The method of claim 2, wherein the cooling station includes a cooling water jacket.

9. The method of claim 1, wherein the step of curing the second polymer coating includes the step of preventing heat from the source of actinic radiation from reaching the first coating.

10. The method of claim 1, wherein the critical limit is a higher limit and the method further includes the step of heating the first coating to the zero-stress temperature region.

11. The method of claim 1, wherein the step of curing the second coating includes cooling the optical fiber after the step of applying the second coating.

12. A method for coating an optical fiber comprising:
   a) applying a photopolymerizable composition to an optical fiber comprising a surface coated with a first polymer coating; and
   b) curing said photopolymerizable composition into a second coating under conditions which set the zero-stress point of the interface between the first and the second coating at a desired temperature range that inhibits the production of thermally induced tensile stresses in said first polymer coating.

13. The method of claim 12, further comprising cooling said optical fiber prior to application of the photopolymerizable composition.

14. The method of claim 12, comprising cooling said fiber by exposing said fiber to a chilled stream of gas prior to application of said photopolymerizable composition.

15. The method according to claim 14, wherein said gas comprises helium.

16. The method according to claim 12, wherein the step of curing includes exposing the photopolymerizable composition to a source of actinic radiation to form a second polymer coating, the method further comprising inhibiting the production of thermally induced tensile stresses in said first polymer coating during exposure by providing said source of actinic radiation with a dichroic reflector that transmits infrared radiation generated by said source away from said fiber.

17. The method according to claim 12, comprising inhibiting the production of thermally induced tensile stresses in said first polymer coating during curing by placing a water-cooled jacket concentrically about said fiber.

18. The method according to claim 17, wherein said water-cooled jacket further comprises a surface comprising a coating that absorbs infrared radiation.

19. The method according to claim 12, comprising inhibiting the production of thermally induced tensile stresses in said first polymer coating during curing by placing a tube concentrically about said fiber, said tube comprising a surface comprising a coating that absorbs infrared radiation.

20. The method according to claim 12 comprising inhibiting the production of thermally induced tensile stresses in said first polymer coating during curing by cooling said fiber with a chilled stream of gas.

21. The method according to claim 20, wherein said gas comprises helium.

22. The method of claim 12, further comprising exposing the photopolymerizable composition to a source of actinic radiation to form the second polymer coating wherein said actinic radiation comprises ultraviolet radiation.

23. The method according to claim 12, wherein said first polymer coating comprises an acrylate-functional silicone polymer.

24. The method according to claim 12, wherein said photopolymerizable composition comprises a photopolymerizable acrylate-functional epoxy composition.

25. The method according to claim 12, wherein said photopolymerizable composition comprises a photopolymerizable acrylate-functional urethane composition.

26. The method of claim 12, wherein the step of curing the photopolymerizable composition includes cooling the optical fiber after the step of applying the second coating.

* * * * *

UNITED STATES PATENT AND TRADEMARK OFFICE
CERTIFICATE OF CORRECTION

PATENT NO.    : 6,630,209 B2
DATED         : October 7, 2003
INVENTOR(S)   : Lynch, Thomas M.

It is certified that error appears in the above-identified patent and that said Letters Patent is hereby corrected as shown below:

<u>Title page,</u>
Item [73], Assignee, delete "Minnesota Mining and Manufacturing Company" and insert in place thereof -- 3M Innovative Properties Company --.

Signed and Sealed this

Sixteenth Day of March, 2004

JON W. DUDAS
*Acting Director of the United States Patent and Trademark Office*